Patented Aug. 27, 1946

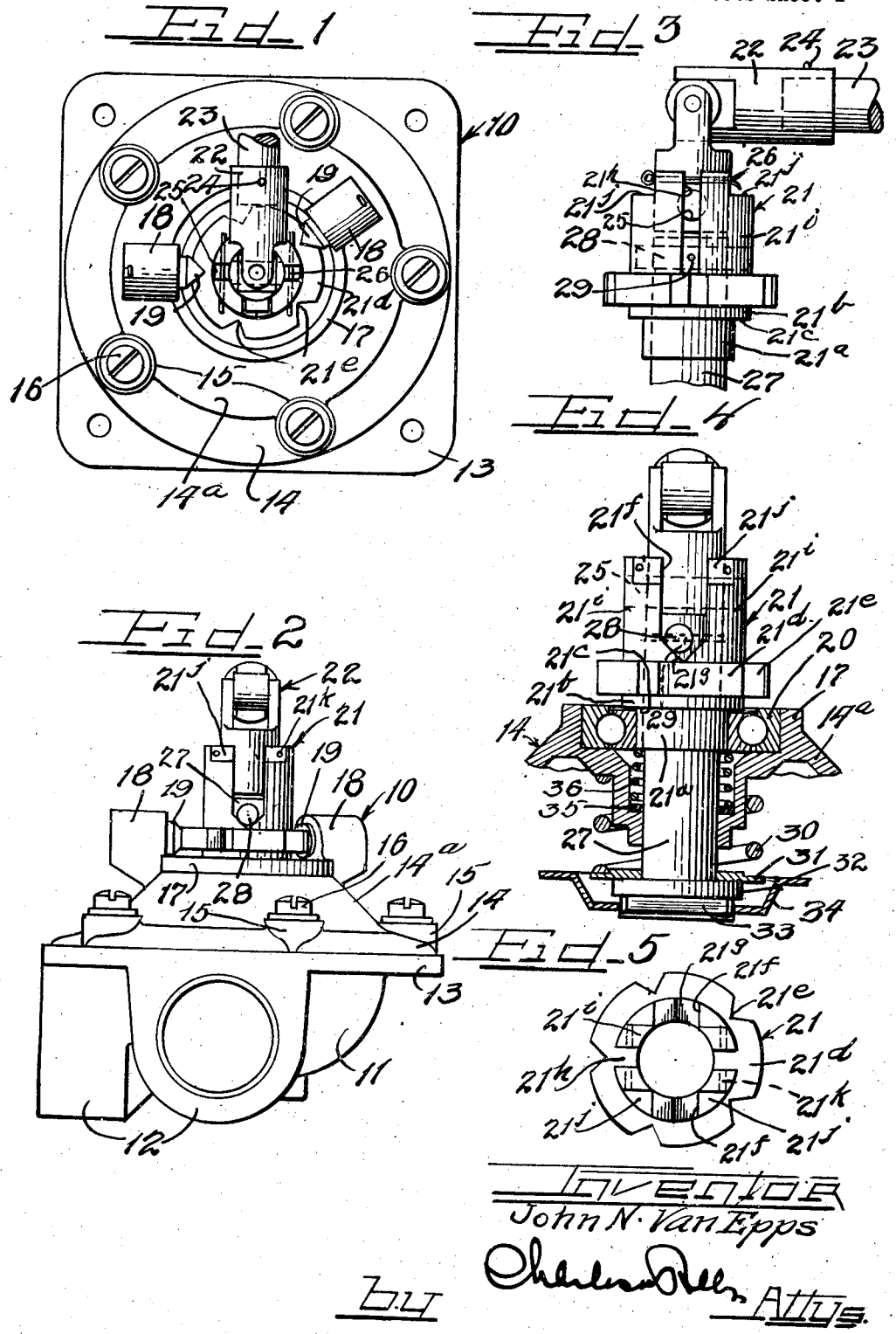

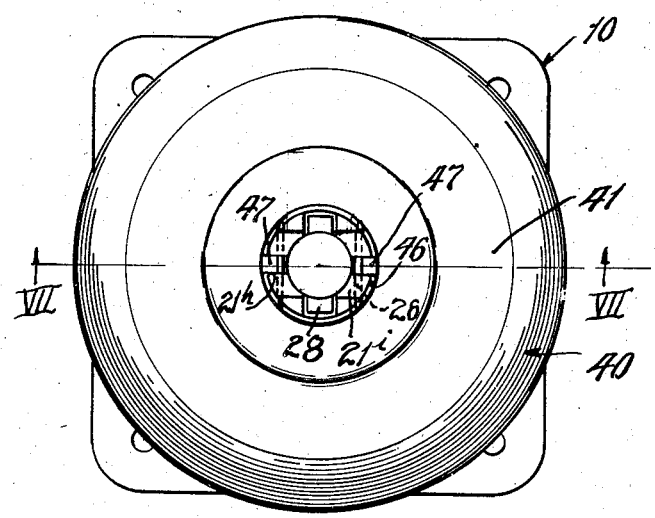
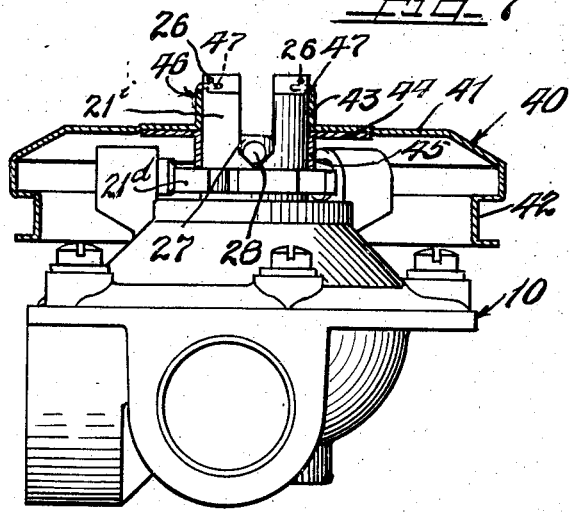

2,406,483

UNITED STATES PATENT OFFICE 2,406,483

YOKE CONSTRUCTION FOR SELECTOR COCKS

John N. Van Epps, Cleveland Heights, Ohio, assignor to Thompson Products, Inc., Cleveland, Ohio, a corporation of Ohio Application February 17, 1943, Serial No. 476,152

5 Claims. (Cl. 251—97)

This invention relates to selector cocks or fluid flow control devices and deals especially with a one-piece sleeve member serving as a means for connecting the cock or device with either an operating pulley or an operating control rod as well as a lifter for the plug valve of the cock or device and a stop member to position the plug or valve.

Specifically the invention relates to a yoke construction adapted to rotate the plug of plug-type valves as well as relieve the spring tension on the plug during rotation.

Heretofore yoke constructions for selector cocks embodying a lifter arrangement for the plug of such cocks have required many milling operations. According to this invention, a yoke is now provided that can be made by a minimum of milling operations. The resulting yoke is stronger than the previously known yokes and is much simpler in construction. Due to the decreased machining and milling operations it is, of course, cheaper to produce.

The yoke of this invention is composed of a sleeve having an outturned collar intermediate the ends thereof. The periphery of the collar can be notched at spaced intervals for cooperating with spring-pressed plungers or detents to control the position of the yoke and thus control the positions of the plug or valve driven by the yoke. The sleeve has four slots extending inwardly from one end thereof to the flange or collar. These slots are located 90° apart and one pair of diametrically opposed slots have concave or V-shaped bottoms to act as cams on a pin carried by the operating post of the plug valve so as to relieve spring tension on the valve whenever the yoke is rotated. By this arrangement, spring pressure can exert its full force on the plug valve whenever the valve is stationary but this spring force is relieved whenever the valve is rotated to a new position, thereby facilitating rotation of the valve and decreasing wear on the seals of the cock. The other pair of diametrically opposed slots can either receive therein the ends of a pin on an operating member such as a rod, universal joint or the like, or the tangs on an operating pulley. Cotter pins passed through the upper end of the sleeve to bridge this pair of slots will retain the operating rod, universal joint or pulley in connected relation to the yoke. The slots in the sleeve, in effect, provide four fingers cooperating to define a cylindrical receptacle for the operating rod or universal joint. The outer faces of these fingers are likewise cylindrical to define a rigid support for the hub of an operating pulley.

The portion of the sleeve on the other side of the collar or flange is unslotted and can be seated in an antifriction bearing to rotatably mount the yoke in the selector cock housing.

It is, then, an object of this invention to provide a simplified, inexpensive and strong yoke construction for selector cocks.

Another object of the invention is to provide a yoke construction for selector cocks which can be made by a minimum of milling operations.

A specific object of the invention is to provide a yoke construction for fluid flow control valves which simultaneously serves as a lifter to relieve spring pressure on the plug of such valves, to act as a stop member for positioning the valve at various desired ports during rotation thereof, and a connector for an operating rod or pulley.

A still further object of the invention is to provide a connector sleeve for plug-type valves having enhanced contact area with the valve-operating means such as a rod, a pulley, or a universal joint.

A further object of the invention is to provide a yoke construction for a selector cock which has four upstanding fingers of appreciable width defining, with their inner faces, a receptacle for an operating rod, and with their outside faces, a support for the hub of an operating pulley.

Other and further objects of the invention will be apparent to those skilled in the art from the following detailed description of the annexed sheets of drawings which, by way of preferred example only, illustrate one embodiment of the invention.

On the drawings:

Figure 1 is a top plan view of a selector cock equipped with a yoke construction according to this invention and illustrating the manner in which this yoke construction can be connected to a universal joint on the end of an operating rod.

Figure 2 is a side elevational view of the selector cock and yoke construction of Figure 1.

Figure 3 is a fragmentary side elevational view of the yoke shown in Figures 1 and 2 illustrating the manner in which the universal joint and the valve plug operating posts are connected to the yoke.

Figure 4 is a side elevational view, with parts broken away and shown in vertical cross section, taken at right angles to Figure 3.

Figure 5 is a top plan view of the yoke construction.

Figure 6 is a top plan view similar to Figure 1 but illustrating an operating pulley mounted on the yoke construction in place of the operating universal joint.

Figure 7 is a vertical cross-sectional view, with parts in elevation, taken along the line VII—VII of Figure 6.

As shown on the drawings:

In Figures 1 and 2 the reference numeral 10 designates generally a selector cock equipped with a yoke construction according to this invention. The selector cock 10 includes a body portion 11 with a plurality of laterally extending bosses 12 having apertures therethrough adapted to receive pipes, tubes or the like. The body 11 provides a frusto-conical well in which a frusto-conical plug is rotatably mounted to selectively place the tubes in the bosses 12 into or out of communication with each other. The casing 11 has a square outturned flange 13 with holes adjacent the corners thereof so that the casing can be directly mounted on a support member such as a wall. The selector cocks of this invention are specially useful to control the flow of fuel from the various tanks of an airplane to the engine. The flange 13 is thus adapted to be directly mounted on a portion of the airplane such as a floor or wall of the fuselage, a wing portion, or the like.

The casing 11 is closed with a circular cover 14 mounted on top of the flange 13 but having its periphery inwardly of the flange so as to leave the corner portions thereof fully exposed. This circular cover can project through an aperture in the member on which the casing is mounted. The cover 14 has a central dome portion 14a projecting upwardly from the flange 13. A plurality of upstanding bosses 15 are provided on the cover and receive cap screws 16 for securing the cover to the flange portion 13 of the casing.

An upstanding circular collar 17 is formed on the upper end of the dome portion 14a of the cover and two hollow bosses 18 are formed on the dome to project above the collar 17. These boss portions receive spring-pressed plungers 19 for a purpose to be more fully hereinafter described.

As best shown in Figure 4, the collar 17 receives a ball bearing 20 therein and the inner race ring of this ball bearing, in turn, receives the yoke construction 21 of this invention.

The yoke 21 is a hollow metal cylindrical sleeve preferably composed of a mild steel case-hardened to resist surface wear and has a reduced end portion 21a snugly fitting the inner race of the ball bearing 20 together with a larger portion 21b providing a flat shoulder 21c at the top of the reduced portion 21a to overlie the inner race of the ball bearing 20.

An outturned cylindrical flange or collar 21d is formed on the sleeve intermediate the ends thereof adjacent the upper end of the portion 21b and has five V-shaped notches 21e at equal intervals around the periphery thereof to receive the spring-pressed plungers 19 so as to delimit rotation of the yoke member. The sleeve projects for a considerable distance above the collar 21d and has a pair of diametrically opposed vertical slots 21f extending inwardly from the top end thereof and terminating in a V-shaped bottom 21g adjacent the top of the collar or flange 21d.

A pair of diametrically opposed slots 21h narrower than the slots 21f extend inwardly from the same end of the slots 21f at right angles thereto. The slots 21f and 21h lie on diameters of the sleeve at right angles to each other. The slots 21h are somewhat narrower than the slots 21f and extend down to the collar 21d.

Four upstanding fingers 21i are thus provided between the slots. Each finger 21i has a partial cylindrical inner face and a partial cylindrical outer face.

The upper end of each finger 21i has a straight cut thereacross providing, on opposite sides of the sleeve, flat bottom and flat sided recesses 21j. Holes 21k are drilled through the fingers to terminate at the flat side walls of the recesses 21j.

As best shown in Figure 3 a universal joint 22 adapted to be rotated by a rod, such as 23, secured in one portion of the joint by means of a cotter pin 24, has the other portion extending in the cylindrical recess provided by the fingers 21i. A pin 25 extends through the portion of the joint in the fingers and has projecting portions seated in the fingers with flat sides extending into the slots 21h. Cotter pins such as 26 extend through the holes 21k of the fingers to bridge the slots 21h and overlie the projecting ends of the pin 25 thus connecting the universal joint member with the yoke member for co-rotation and preventing removal of the universal joint member from the yoke member. The head of the cotter pin can be seated against the flat side wall of one recess 21j while the other end of the cotter pin can be spread against the other flat side wall of the other recess 21j.

As best shown in Figure 4, a post 27 extends into the yoke construction 21 from the bottom end thereof and has a transverse pin 28 therethrough projecting into the slots 21f. A cotter pin 29 can be passed through the pin 28 and top end of the post 27 to hold the pin 28 in the post. The pin 25 in the universal joint member can be press-fitted into the member but it is desirable to be able to remove the pin 28 from the post to disconnect the yoke construction from the post and for this reason the pin 28 is not press-fitted into the post but is held therein by means of a removable cotter pin. The cotter pin 29 is readily inserted through the slots 21h of the yoke member.

A heavy spring 30, as shown in Figure 4, is held under compression between the cover 14 and a spring retainer 31 carried on a thrust bearing 32 which is bottomed by a rectangular key member 33 on the bottom of the post. The key member 33 seats into a slot in the top wall of the plug 34 to rotate the plug therewith. The thrust bearing 32 can be of compressed graphitic material and normally thrusts against the top wall of the plug to urge the plug into seating engagement in the casing 11. However, whenever the yoke member 21 is rotated the pin 28 will be acted on by the V-shaped cam surfaces 21g at the bottom of the slots 21f and will climb these surfaces to raise the post and relieve the spring thrust on the plug 34 as shown in Figure 4. Thus the thrust bearing 32 may be lifted off of the top wall of the plug. As soon as the yoke member is at rest, however, the pin 28 will slide down to the bottom of the slots 21f and the thrust bearing 32 will again act on the plug to urge it into proper seated position in the casing 11.

A packing 35 can be provided in the cover around the post 27 to prevent leakage out of the casing along the post. The packing is urged against the shoulder provided by the cover 14 by means of a spring 36.

From the above description it will be understood that the yoke member 21 serves as a connection means between the post 27 and the universal joint 22 so that the rod 23 can be rotated to operate the plug 34 whenever desired. During rotation of the yoke member 21, however, spring pressure on the plug 34 is relieved as explained above. The spring pressed plungers 19 will ride around the periphery of the collar 21d of the yoke member and will drop into the notches 21e to locate the plug at various positions in the casing 11.

The post 27 projects into the yoke member 21 and is held therein by the pin 28. Of course, the spring 30 urges the pin 28 against the cam surfaces provided by the V-shaped bottoms 21g of the slots 21f.

The yoke member 21 can be formed with but three milling operations. Thus both slots 21f can be formed by one milling operation, both slots 21h and the notches 21j can be formed by a second milling operation including a central mill cutter for the slots 21h and side mill cutters spaced laterally from the central cutter for the notches 21j, and all the recesses 21e in the collar 21d can be formed by the third milling operation. If it is desired to arrange the slots 21h so that the pin 25 of the universal joint 22 fits only in one position in the yoke, this pin can have projecting ends of different widths and a fourth milling operation can widen one slot 21h to accommodate the wide pin end which will not fit into the narrow slot 21h resulting from the second milling operation.

Removable cotter pins hold the assembly in operative position and these cotter pins are readily removed to remove either the yoke from the post or the universal joint from the yoke.

Instead of driving the yoke member 21 by means of a universal joint operated from a rod 23, as shown in Figures 6 and 7, the yoke member can be driven by a pulley 40. The pulley 40 is composed of a stamped metal body member 41 having a grooved periphery 42 adapted to receive a driving cord or belt. An upturned cylindrical portion 43 is provided on the body member. A disk 44 is spot-welded or otherwise secured to the central portion of the body member along the inner face thereof and has a downturned cylindrical portion 45 aligned with the cylindrical portion 43. The portions 43 and 45 provide a central hub 46 for the pulley 40.

The upturned portion 43 of the pulley has tangs 47 thereon adapted to be bent down into the slots 21h of the yoke member. The cotter pins 26 extend through the holes 21k in the fingers of the yoke member to overlie the tangs 47 and thus mount the pulley in position. The bottom of the downturned portion 45 of the pulley rests on the collar 21d of the yoke member.

The fingers 21i of the yoke member afford a substantial cylindrical bearing or mounting for the hub 46 of the pulley.

Thus the yoke construction of this invention has cylindrical bearing surfaces on the inside thereof for receiving a driving member such as a universal joint as well as cylindrical bearing surfaces on the outside thereof for receiving a driving member such as a pulley.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a selector cock construction including a casing having a seat and a plug rotatable in said casing and engageable with said seat, a plug-driving member including a cylindrical stem and having a driving interengagement with said plug, a spring acting on said driving member to bias said plug into engagement with the seat, a sleeve encircling said stem in relatively axially and rotatably movable relation and having a peripheral bearing surface on the stem-encircling portion thereof, a bearing supported by the casing encircling said bearing surface and supporting the sleeve rotatably, a radially projecting collar portion on the sleeve outwardly of said bearing surface and having delimiting notches therein, detents engageable in said notches, a portion of the sleeve projecting substantially outwardly beyond the collar portion and having bisecting slots therein, one of said slots having substantially V-shaped cam surfaces adjacent to said collar portion, a pin carried by the outer end portion of said stem and projecting laterally therefrom to ride said cam surfaces to be cammed axially outwardly and move said plug driving member outwardly against the spring bias, a driver for said sleeve including laterally extending elements for effecting corotation received within the remaining slot, and retaining members secured across the outer end portions of said remaining slot.

2. In a selector cock construction including a casing having a seat and a plug rotatable in said casing and engageable with said seat, a plug-driving member including a cylindrical stem and having a driving interengagement with said plug, a spring acting on said driving member to bias said plug into engagement with the seat, a sleeve encircling said stem in relatively axially and rotatably movable relation and having a peripheral bearing surface on the stem-encircling portion thereof, a bearing supported by the casing encircling said bearing surface and supporting the sleeve rotatably, a radially projecting collar portion on the sleeve outwardly of said bearing surface and having delimiting notches therein, detents engageable in said notches, a portion of the sleeve projecting substantially outwardly beyond the collar portion and having bisecting slots therein, one of said slots having substantially V-shaped cam surfaces adjacent to said collar portion, a pin carried by the outer end portion of said stem and projecting laterally therefrom to ride said cam surfaces to be cammed axially outwardly and move said plug driving member outwardly against the spring bias, a driver for said sleeve including laterally extending elements for effecting corotation received within the remaining slot, and retaining members secured across the outer end portions of said remaining slot, said retaining members affording a space axially in the slot for axial sliding movement of the corotation elements.

3. In a selector cock construction including a casing having a seat and a plug rotatable in said casing and engageable with said seat, a plug-driving member including a cylindrical stem and having a driving interengagement with said plug, a spring acting on said driving member to bias said plug into engagement with the seat, a sleeve encircling said stem in relatively axially and rotatably movable relation and having a peripheral bearing surface on the stem-encircling portion thereof, a bearing supported by the casing encircling said bearing surface and supporting the sleeve rotatably, a radially projecting collar portion on the sleeve outwardly of said bearing surface and having delimiting notches therein, detents engageable in said notches, a portion of the sleeve projecting substantially outwardly beyond the collar portion and having bisecting slots therein, one of said slots having substantially V-shaped cam surfaces adjacent to said collar portion, a pin carried by the outer end portion of said stem and projecting laterally therefrom to ride said cam surfaces to be cammed axially outwardly and move said plug driving member outwardly against the spring bias, a driver for said sleeve comprising a stem extending into said outwardly projecting portion of the sleeve and having laterally extending pin means received within the remaining slot for effecting corotation of the driver and sleeve, and means for retaining said pin means against displacement from said remaining slot.

4. In a selector cock construction including a casing having a seat and a plug rotatable in said casing and engageable with said seat, a plug-driving member including a cylindrical stem and having a driving interengagement with said plug, a spring acting on said driving member to bias said plug into engagement with the seat, a sleeve encircling said stem in relatively axially and rotatably movable relation and having a peripheral bearing surface on the stem-encircling portion thereof, a bearing supported by the casing encircling said bearing surface and supporting the sleeve rotatably, a radially projecting collar portion on the sleeve outwardly of said bearing surface and having delimiting notches therein, detents engageable in said notches, a portion of the sleeve projecting substantially outwardly beyond the collar portion and having bisecting slots therein, one of said slots having substantially V-shaped cam surfaces adjacent to said collar portion, a pin carried by the outer end portion of said stem and projecting laterally therefrom to ride said cam surfaces to be cammed axially outwardly and move said plug driving member outwardly against the spring bias, a driver for said sleeve including laterally extending elements for effecting corotation received within the remaining slot, and retaining members secured across the outer end portions of said remaining slot, said driver being a pulley comprising a hub portion surrounding said sleeve and said laterally extending elements being inwardly turned portions of said hub.

5. In a yoke structure adapted to connect in corotational assembly a driver and a spring-biased plug driving member equipped with a stem, a sleeve adapted for relative axial and rotational encirclement of the stem and having a peripheral bearing surface on the stem-encircling portion thereof for encirclement by a bearing to support the sleeve rotatably, a laterally projecting collar portion on the sleeve outwardly of said bearing surface and having delimiting notches therein adapted to be engaged by detents, a portion of the sleeve projecting substantially outwardly beyond the collar portion and having bisecting slots therein, one of said slots being adapted to receive a laterally projecting pin on the stem and having substantially V-shaped cam surfaces adjacent to said collar portion for cooperation with the pin to move the plug driving member outwardly against its spring bias, the remaining slot being adapted to receive corotational elements of the driver in interengaging relation therein and to have element-retaining members secured across the outer end portions thereof.

JOHN N. VAN EPPS.